Patented Nov. 4, 1952

2,616,808

UNITED STATES PATENT OFFICE 2,616,808

PRODUCTION OF EXPANDED RICE PRODUCTS

Robert L. Roberts, Piedmont, Calif., assignor to the United States of America as represented by the Secretary of Agriculture No Drawing. Application January 24, 1950, Serial No. 140,357

3 Claims. (Cl. 99—81)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to rice and has as its prime object the provision of processes for preparing novel, expanded, ready-to-eat rice products. Further objects of this invention will be obvious from the description herein.

It has been found that if rice is subjected to a particular type of treatment, as herein described, the rice is converted into a food product of unusual properties. Briefly described, the treatment involves subjecting dry parboiled rice to heat applied, for example, as hot air or hot oil. As a result of this treatment the rice is expanded so that the kernels have a volume of about 2 to 6 times that of the original kernels. Moreover, this expansion does not rupture the kernels nor distort their shape; thus the expanded kernels have the same shape as the original kernels except that their dimensions are larger, the expansion being caused by the formation of a multitude of small spheroidal voids uniformly dispersed throughout the interior of the rice kernels. The rice material is thus changed from a dense, hard material into a light, porous and crisp material which can be easily crushed between the fingers or teeth. The final rice product is completely cooked and the surfaces thereof browned to an attractive degree. The products so produced are crisp and ready to eat and are eminently suited for out-of-hand eating and are excellent as an hors d'oeuvre, a supplement to beverages or soups, or as a breakfast cereal. The products can be packaged in sealed containers or in paper or cellophane bags and retain their flavor and crispness for extended periods of time.

The raw material for this process is dry parboiled rice, that is, rice which has been subjected to a cooking treatment and then dried so that it will keep on storage. Thus suitable materials are, for example, the rice products available on the market under such names as processed rice or parboiled rice. These products are prepared by steeping rough (paddy) rice in hot water, steaming it to gelatinize the starch, then drying the cooked product and milling it to remove the hull and bran layers. The resulting products consist essentially of the rice endosperm in an at least partially cooked state. The parboiled rice may be prepared from many varieties of rice such as the short-grain, medium-grain, or long-grain varieties. In general, I prefer parboiled rice of the pearl (short-grain) variety as yielding products of maximum increase in volume.

The heat treatment of the parboiled rice can be effected by many alternative procedures. For example, the rice can be placed on a heated surface, be subjected to radiant heat, or be treated with a heated fluid medium. In general I prefer the latter method and particularly heating the rice in a current of hot air or in a bath of hot oil. Regardless of what type of heating is used the rice should be subjected to a temperature from about 170° C. to about 250° C. In general, the time for the heat treatment may be varied from about 10 seconds to about 1 minute depending on the temperature used, the higher temperatures giving faster results. In any particular case, the proper time for heat treatment can be determined by observing the kernels under treatment and discontinuing the heating when the kernels have reached the desired degree of expansion. The degree of expansion also depends on the temperature, the maximum occurring at about 200°–220° C. Another factor to be considered is the moisture content of the raw material, since this factor affects the degree of expansion of the products. In general, the raw material which contains from about 8% to about 14% water yields products of maximum volume. It is evident that any given sample of raw material can be subjected to drying or moistening before the heat treatment to establish any desired moisture level. Thus to lower the moisture content of the raw material it may be placed in a conventional drying oven and subjected to a current of warm air. To increase the moisture content the raw material may be placed in a container and contacted with humid air until it picks up the desired amount of moisture.

In conducting the heat treatment by means of a current of hot air, the parboiled rice may be placed on trays in an oven supplied with a current of air at the appropriate temperature. Usually, however, I prefer to carry out this type of heat treatment in a duct heater wherein the rice kernels are subjected to a blast of air at such a velocity that when the density of the kernels becomes attenuated due to the expansion they float in the air stream and are carried out of the heater. A convenient apparatus of this type consists of an elongated, vertically disposed chamber provided with an inlet for hot air at the bottom and an outlet for spent air and product at the top. A screen is provided near the bottom of the inlet pipe to prevent the rice from entering the inlet pipe if the air pressure drops. In using such apparatus, the parboiled rice is placed on the screen and the hot air is introduced into the pipe at such a velocity that the kernels tumble about. As the heat treatment proceeds the kernels expand and become buoyant and are carried by the air stream out of the pipe and into a separator, such as a cyclone, where the kernels are separated from the air stream.

In carrying out the heat treatment in oil, one can use any edible oil, as for example, soybean oil, cottonseed oil, corn oil, sesame seed oil, hydrogenated vegetable oils, lard, and so forth. The rice kernels are cooked in the oil until the boiling, which is caused by expulsion of steam from the rice, ceases. Proper cooking time usually takes from about 15 seconds to about 1 minute.

If desired, flavoring or other additive materials may be applied to the finished products. Thus the products can be mixed with sugar, salt, or a mixture of salt and monosodium glutamate. The products produced by heating in air can be given a nut-like flavor by tumbling them with a mixture of salt and an edible oil. The products can also be flavored by adding flavoring agents to the heating medium. Thus, for example, the processed rice may be subjected to treatment with a current of hot air containing a small proportion of hickory wood smoke whereby the final product will have a smoky flavor.

The following examples demonstrate the invention in greater detail. It is understood that these examples are furnished only by way of illustration and not limitation.

EXAMPLE I

A lot of parboiled California pearl rice (moisture content, 12%) was heated in peanut oil at 200° C. for 20 seconds. The product was removed from the oil, cooled on absorbent paper and the bulk volume determined. It was found that the product had a bulk volume about 5.5 times that of the original rice.

The experiment as above described was repeated employing as raw materials lots of parboiled California pearl rice of different moisture contents. The results obtained are set forth in the following table:

Table 1

| Experiment No. | Moisture content of raw material, percent | Ratio of volume of product to volume of original rice |
| --- | --- | --- |
| 1 | 5 | 2.5 |
| 2 | 5.5 | 3 |
| 3 | 8 | 5 |
| 4 | 10 | 5 |
| 5 | 12 | 5.5 |
| 6 | 14 | 5 |
| 7 | 16 | 4 |
| 8 | 18 | 3 |
| 9 | 21 | 2.5 |

EXAMPLE II

Several portions of parboiled California pearl rice (moisture content, 11%) were heated in peanut oil at temperatures ranging from 140° C. to 240° C. The products in each case were drained and cooled on absorbent paper and their bulk volumes measured. The results obtained are set forth in the following table:

Table 2

| Experiment No. | Temperature of oil, °C. | Time of heating, seconds | Ratio of volume of products to volume of original rice |
| --- | --- | --- | --- |
| 1 | 140 | 60 | 1.1 |
| 2 | 150 | 60 | 1.3 |
| 3 | 170 | 30 | 2.7 |
| 4 | 190 | 20 | 4.6 |
| 5 | 200 | 15 | 5.8 |
| 6 | 220 | 15 | 6.2 |
| 7 | 240 | 15 | 5.8 |

EXAMPLE III

A sample of processed California pearl rice was placed in a duct heater where it was subjected to a blast of air at 200° C. After a residence of 15 to 20 seconds, the rice kernels had expanded sufficiently to become buoyant and were carried out of the heater by the air blast and collected in a cyclone separator. The products were similar in appearance to those prepared by heating in oil and had a bulk volume three times that of the original rice.

Having thus described the invention, what is claimed is:

1. A process for preparing ready-to-eat rice products which comprises providing discrete grains of parboiled rice, said grains being in an at least partially cooked state having a dense, hard structure and a moisture content from about 8% to about 14%, subjecting said grains to a heat treatment at a temperature from about 170° C. to about 250° C., whereby the said grains are expanded to form porous crisp grains having the same shape as the original grains, the expansion causing the formation of a multitude of small spherical voids uniformly dispersed throughout the interior of the kernels, said porous grains having a bulk volume from about 2 to about 6 times that of the starting grains.

2. A process in accordance with claim 1 wherein the heat treatment is applied by means of hot oil.

3. A process in accordance with claim 2 wherein the heat treatment is applied by means of hot air.

ROBERT L. ROBERTS.

REFERENCES CITED

The following references are of record in the file of this patent:

UNITED STATES PATENTS

| Number | Name | Date |
| --- | --- | --- |
| 1,266,448 | Fukuda | May 14, 1918 |
| 1,631,145 | Newman | June 7, 1927 |
| 1,655,726 | Fujita | Jan. 10, 1928 |
| 1,925,267 | McKay | Sept. 5, 1933 |

OTHER REFERENCES

Lord, Everybody's Cook Book, Harcourt, Brace & Co., N. Y., page 201.

Washington Post, December 28, 1947.